US010042695B1

(12) United States Patent
Karppanen (10) Patent No.: US 10,042,695 B1
(45) Date of Patent: Aug. 7, 2018

(54) PROGRAM EXCEPTION RECOVERY (71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 14/867,549

(22) Filed: Sep. 28, 2015

(51) Int. Cl.
*G06F 11/00* (2006.01)
*G06F 11/07* (2006.01)
*G06F 17/30* (2006.01)

(52) U.S. Cl.
CPC ...... *G06F 11/0793* (2013.01); *G06F 11/0706* (2013.01); *G06F 11/079* (2013.01); *G06F 11/0751* (2013.01); *G06F 17/30896* (2013.01); *G06F 17/30905* (2013.01)

(58) Field of Classification Search
CPC ............ G06F 11/0706; G06F 11/0703; G06F 11/3672; G06F 11/3612; G06F 11/0793; G06F 11/0751; G06F 11/079
USPC ........................................................ 714/38.1
See application file for complete search history.

(56) References Cited

U.S. PATENT DOCUMENTS

| | | | | |
|---|---|---|---|---|
| 2011/0231696 A1* | 9/2011 | Ji | ........................ | G06F 11/1438 714/3 |
| 2012/0233501 A1* | 9/2012 | Kanso | ................... | G06F 11/008 714/26 |
| 2013/0007503 A1* | 1/2013 | Anaya | ................. | G06F 11/2035 714/4.1 |
| 2013/0179729 A1* | 7/2013 | Chiu | ....................... | G06F 12/16 714/19 |
| 2014/0149789 A1* | 5/2014 | Kim | ..................... | G06F 11/1433 714/15 |
| 2014/0189419 A1* | 7/2014 | Guo | ........................ | H04L 67/38 714/4.4 |
| 2014/0245077 A1* | 8/2014 | Kanso | ................. | G06F 11/1482 714/47.3 |
| 2016/0041866 A1* | 2/2016 | Oleynikov | .......... | G06F 11/0793 714/15 |

* cited by examiner

*Primary Examiner* — Sarai E Butler
(74) *Attorney, Agent, or Firm* — Thorpe North & Western LLP (57) ABSTRACT

A technology is described for recovering from a program exception. An example method may include detecting an occurrence of a program exception while rendering electronic content using an application that results in the application to stop rendering the electronic content. An execution history associated with the rendering of the electronic content may be analyzed to identify a failed executable object and a rendering component utilized by the failed executable object to render the electronic content may be identified. A determination may then be made whether the rendering of the electronic content may be recoverable by analyzing the failed executable object. A new executable object may then be constructed and may be associated with the rendering component utilized by the failed executable object as a result of a determination that the rendering of the electronic content may be recoverable, and rendering of the electronic content may be restarted.

22 Claims, 7 Drawing Sheets

PROGRAM EXCEPTION RECOVERY

BACKGROUND

Software applications that are executed on a computing device may stop functioning as a result of an error encountered during execution of the software application. An error may be the result of a process or a process thread that may be executing incorrectly. Some common examples of errors may include an attempt by a process to read or write to computer memory that is not allocated to the process for reading or writing (e.g., a memory access violation), or an unhandled program exception that results in the termination of a process. In the event of an error, a user may restart the software application or reload electronic content displayed by the software application.

Some software applications may be based on multi-process architectures that may use sandboxed child processes that separate a child processes from a parent process, thereby avoiding having to terminate a parent process when a child process stops functioning. In the event that a sandboxed child process stops functioning (e.g., due to a memory access violation or an unhandled program exception), the child process may be terminated and a new sandboxed child process may be launched.

DETAILED DESCRIPTION

A technology is described for recovering from a program exception in a thread that occurs during execution of a software application on a computing device. In one example, an application may render electronic content via threads that perform various rendering tasks. In some instances, the execution of a method call, function, object or the like may result in a program exception that may cause rendering of electronic content to stop. In the event that a program exception occurs, the program exception may be detected and a determination may be made whether recovery from the program exception may be attempted.

As an illustration, after detecting the occurrence of a program exception during rendering of electronic content (e.g., an electronic page, document, video, video game, etc.) a stack backtrace, identifier stack, or another type of execution history may be analyzed to identify a failed executable entity (e.g., method call, function, sub-program, procedure, executable object, dynamic link library (DLL)) that caused the program exception. Illustratively, a thread may execute a method call included in a browser component (e.g., a rendering engine, a graphics engine, layout engine, etc.) used to render electronic content. In one example, a method may be a procedure associated with an object class where the method acts as an interface to an object created using the object class.

After identifying a failed executable entity which has captured or caused the program exception, one or more rendering components (e.g., objects, files, records, arrays, etc.) referenced by the failed executable entity may be identified. The failed executable entity may reference (e.g., read and/or write) the rendering components as part of performing a rendering task. Therefore, the rendering component may have failed due to the program exception created by the rendering components not being available, the rendering components being corrupted, or some other flaw.

Having identified the failed executable entity and rendering components, a determination may be made whether rendering of the electronic content may be recoverable. For example, features of the failed executable entity (e.g., read/write features) and features of the rendering components (e.g., external/internal management features, such as use of shared data, etc.) may be analyzed using recovery criteria to determine whether the features satisfy the recovery criteria. In the case that rendering of the electronic content may be recoverable, the failed executable entity may be terminated and the failed entity and any failed rendering components may be discarded. A new executable entity may then be constructed, or an existing executable entity may be obtained and the executable entity may reference new rendering components that replace the failed rendering components, and/or the executable entity may reference intact rendering components that were used by the failed executable entity. Rendering of the electronic content may then be resumed where the new executable entity and any new rendering components may be used in place of the failed executable entity and any failed rendering components.

In the past, when an executable entity associated with an application has stopped functioning correctly (e.g., crashed) due to a program exception, a common response has been to terminate a thread or process used to execute the executable entity, prompting a user to restart the application and/or reload content displayed in the application. The same holds true for sandboxed threads (e.g., processes) that have stopped functioning. Terminating a sandboxed thread may avoid having to restart an application, but may still result in having to start a new sandboxed thread and reload content displayed in an application window, for example. Generally an assumption may have been made that if a memory access violation or unhandled exception occurs, a thread and associated objects would be in an undefined state. Therefore recovery of the thread may not have been attempted because continuing execution of the thread may have led to further crashes and undefined behavior of the thread.

As a result of the present technology, a recovery from a program exception may be attempted when a failed thread that executed a method call or object that caused the program exception may be recoverable. Thus, rendering of electronic content may be resumed as opposed to having to restart an application or reload content displayed in an application window.

Figure 1:
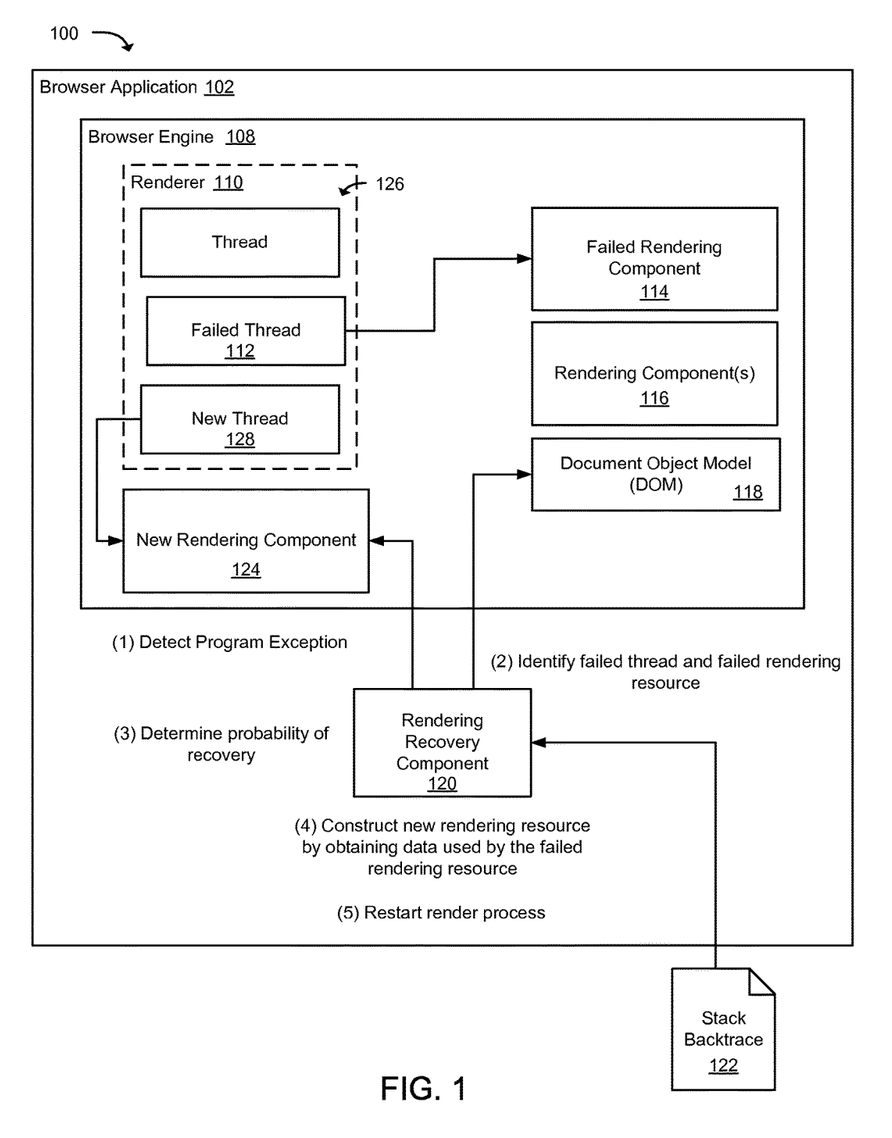
FIG. 1 is a block diagram illustrating an example system for recovering from a program exception that occurs during rendering of electronic content using a browser application.

FIG. 1 is a diagram illustrating a high level example of a system 100 having a rendering recovery component 120 that may be used as part of a method to attempt a recovery in the event of a program exception. The system 100 may include a browser application 102 configured to display electronic content, such as an electronic page (e.g., documents formatted using Hypertext Markup Language (HTML), Cascading Style Sheets (CSS), Extensible Markup Language (XML), and other standards), image files, video, interactive gaming, and other electronic pages that may be rendered.

The browser application 102 may be configured to render electronic content displayed to a user within a browser window using a browser engine 108. In one example, a browser engine 108 may be a software component of a browser application 102 that processes electronic content by formatting information for the electronic content and rendering the formatted electronic content using a renderer 110 onto a content area of a browser window displayed on a computer display. In rendering electronic content, the browser engine 108 may cause at least one renderer 110 to be executed. Each renderer 110 may include multiple threads 126 that perform various rendering tasks (e.g., reading data, writing data, parsing content, rendering content, painting content to a content area or frame buffer, etc.) associated with rendering electronic content for display in the browser application 102.

Rendering components 116 may be referenced by the threads 126 while performing rendering tasks. Rendering components 116, in one example, may be objects referenced by threads 126 to perform various rendering tasks. For example, a rendering component 116 may be a StyleSheet object, Document Object Model (DOM) object, texture object, etc. that may be referenced by a thread 126. Other rendering components 116 used to render electronic content not specifically mentioned here are also within the scope of this disclosure.

In performing a rendering task, a thread 126 used to execute a method call, function call, an executable object or the like may cause a program exception due to an error related to performing the rendering task. As an illustration, a race condition included in instructions executed using a thread 126 that performs a graphics rendering task may result in a program exception when a resource (e.g., an image or texture) referenced by the instructions has not been loaded into computer memory. The thread 126 may attempt to reference the unloaded resource resulting in the program exception. Because not all program exceptions are fully deterministic, or are a result of malicious security exploits, a program exception may not likely be repeated if the failed rendering task is attempted a second time. For example, some race conditions that occur in a renderer 110 might cause a program exception in only a small percentage of cases of the renderer 110 being executed. Therefore, a recovery from a program exception may be attempted by reconstructing an internal process state using already existing parts of the internal state from the failed rendering task. For example, a graphics layer of an electronic page may be recreated from an existing Document Object Model (DOM) 118 that was loaded when rendering of an electronic page was initiated.

As illustrated, the rendering recovery component 120 may be configured to detect an occurrence of a program exception (e.g., receive a notification of the exception) during rendering of electronic content using the browser engine 108. The occurrence of the program exception may cause rendering of the electronic content to stop. In one example, a program exception handler may be associated with a renderer 110 or with threads 126 included in a renderer 110, or a program exception handler may be called by a method call or executable object. In the event that a program exception occurs, the program exception handler may be invoked and the rendering recovery component 120 may be launched. In another example, the rendering recovery component 120 may be configured to monitor operations of a browser application 102 and detect the occurrence of a program exception.

In response to detecting the program exception, the rendering recovery component 120 may be configured to identify an execution history associated with rendering the electronic content. An execution history may be a stack backtrace 122, identifier stack, an execution log, flags or variables that may be set as a method call or executable object is entered and exited, as well as other types of execution histories. In one example, an identifier stack may be used to identify method call or object executed using a failed thread 112 and any failed rendering components 114 referenced by the method call or executable object that caused the program exception. The identifier stack may be maintained by the browser application 102 where executable object identifiers may be added and removed from the identifier stack when entering and exiting method calls. An executable object identifier located on top of the identifier stack at the time of a program exception may be identified as being associated with a method call or object that caused the program exception.

In another example, a stack backtrace 122 associated with executing a browser application 102 may be identified (e.g., the stack backtrace 122 may be managed by an operating system). The stack backtrace 122 may be a record of active stack frames at a point in time when a program exception occurred. The stack backtrace 122 may be used to identify a method call or object executed using a failed thread 112 and any failed rendering components 114 referenced by the method call or executable object. For example, the stack backtrace 122 may be analyzed by loading the stack backtrace 122 into computer memory (e.g., into application space memory) and utilizing a debugging service to identify a failed method call or executable object that caused the program exception. In analyzing the stack backtrace 122, stack frames may be examined to identify the failed method call or executable object that caused the program exception. For example, a stack frame associated with a method call that has not yet terminated with a return call may correspond to a failed thread 112. Because the method call did not terminate, the method call may be the likely cause of the program exception, and a point at which the failed thread 112 encountered an error.

In the case that a stack backtrace 122 includes debugging symbols (e.g., information identifying which programming-language constructs generated machine code in an executable module), the identity of a failed method call or executable object may be identified using the debugging symbol. For example, the debugging symbol may be used to identify a method call associated with the failed thread 112. In the case that a stack backtrace 122 does not include debugging symbols, a memory address associated with a stack frame may be used to identify a failed method call or executable object. As a specific example, the memory address may be used to identify a debugging symbol in a debugging file, such as a Program Database (PDB) file, and the debugging symbol may be used to identify the symbolic name of a failed method call. Alternatively, the memory address may be used directly to identify a method call on the call stack.

In another example, a callable sub-program (e.g., procedures, methods, functions, and subroutines), which may be executed as part of rendering electronic content in a browser application 102 may be named such that the sub-program may be easily identified in a stack backtrace 122. For example, a sub-program may be given a name (e.g., Function renderProcess_1575) that may be used to identify the sub-program (e.g., RenderProcess_1575). Alternatively, dummy functions may be inserted into sub-programs executed as part of rendering electronic content. The dummy functions when executed may write an identifier to a stack backtrace 122 or to a global variable within the scope of the rendering recovery component 120. The identifier on the stack backtrace 122 or in the global variable may be used to identify the sub-program in the event that a program exception occurs.

After identifying a failed thread 112 that was used to execute a failed method call or executable object, one or more failed rendering components 114 that may have been utilized by the failed thread 112 may be identified and a determination may be made whether a failed rendering component may be recoverable. For example, having identified a failed thread 112, the failed thread 112 may be analyzed to identify whether the failed thread 112 made calls to a failed rendering component 114 that may have resulted in a modification made to the failed rendering component 114. Namely, a stack backtrace 122 may be analyzed to identify a failed rendering component 114 utilized by a failed thread 112.

Whether recovery from a program exception may be possible may be based in part on recovery criteria that may be used to evaluate the recoverability of one or more failed rendering components 114. In one example, features of a failed method call or executable object and/or features of a failed rendering component 114 may be analyzed to determine whether the features satisfy recovery criteria used in determining whether recovery from a program exception may be possible. Example recovery criteria may include criteria that a failed method call or executable object perform read-only operations or mostly read-only operations, or that the method call or executable object not reference a large number of rendering components 116. Also, recovery criteria may include a criterion that a failed rendering component 114 not be managed by more than one thread 126. Other recovery criteria are contemplated and are within the scope of this disclosure.

As an illustration, features of a failed method call may be evaluated against a recovery criterion to determine whether Input/Output (I/O) features of the failed method call meet a recovery criterion that the failed method call performs read-only operations, or mostly read-only operations. As another illustration, features of a failed method call may be evaluated to determine whether interactive features of the failed method call satisfy a recovery criterion that the failed method call not interact with a large number of rendering components 116.

In one example configuration, tags or descriptors (e.g., static member variables) may be used to mark entering and exiting portions of code segments that when executed are known to perform render processes having certain features. For example, a code segment associated with a method call that is known to have a low probability of modifying rendering components 116 may be tagged as "Recoverable", and a method call known to have a high probability of modifying rendering component may be tagged as "Non-recoverable". The tags may be used in determining whether recovery from the program exception may be possible. For example, recovery from a program exception may be attempted when a code segment has a "Recoverable" tag, and recovery may not be attempted when a code segment has a "Non-recoverable" tag.

In the case that a determination may be made that recovery from a program exception may be attempted, a failed thread 112 may be abandoned and variables utilized by a failed method call or executable object may be cleared (e.g., variables used to turn off timers that could cause further execution of code within a failed thread), and a failed rendering component 114 (or multiple failed rendering components 114) may be discarded. In another example, references to internal objects included in a failed executable object may be cleared, thereby indicating an internal error state of the failed executable object and preventing the objects from being used. In one example, user input, such as form input entered by a user in an electronic page, or game play input submitted by a user may be preserved, so that if rendering of the electronic page or video game is resumed, the user input may not be lost.

In one example, safety variables may be used to terminate any loops with as few side effects as possible. For example, after the browser application 102 has stopped functioning correctly, well-known Booleans or pointers/references may be cleared without having to acquire locks, resulting in an unconditional exit from any executing code when the Booleans or pointers/references are referenced by the code, thereby increasing a probability of avoiding further failures. As an illustration, code may include a Boolean that remains constant (true) during normal program flow, but the Boolean may be modified (false) in the event of a failure. A Boolean check may be performed within a loop and in the case of a failure, the Boolean may be set to false. When set to false, a thread may attempt to return from the function rather than continue iterating through the loop.

In one example, the failed rendering component 114 may be abandoned (as opposed to being discarded), such that destruction of the failed rendering component 114 and cleanup of memory resources used by the failed rendering component 114 may be postponed until after recovery from the program exception has been attempted. In another example, destruction and/or clean-up of the failed rendering component 114 may also be postponed indefinitely. For example, the failed rendering component 114 may be allowed leak memory until the browser engine 108 terminates due to a risk of attempting a clean-up of resources that may be in an undefined state.

In one example, a new thread 128 may be obtained from a thread pool and may be tasked to execute a rendering task from an execution stack. In another example, a new thread 128 may be constructed to replace the failed thread 112. In the case that the new thread 128 may reference a failed rendering component 114, a new rendering component 124 may be constructed using data obtained from data sources that were utilized by the failed rendering component 114. For example, the rendering recovery component 120 may be configured to obtain data used to construct the new rendering component 124 from an existing DOM 118, other rendering components 116, or from external data sources that provided data used by the failed rendering component 114. In some cases, data used to construct the new rendering component 124 may be obtained from an abandoned failed rendering component 114 if ownership of the data is managed externally. As a specific example, graphics textures may be recovered from an Open Graphics Library (OpenGL) object when the OpenGL object is managed externally (e.g., not managed by a failed thread 112). More specifically, OpenGL resources may be managed by a graphics driver via handles and/or identifiers provided to the browser engine 108. The graphics driver may be external to the browser engine 108 and may be in a stable state. Therefore, because existing OpenGL resources allocated to the failed rendering component 114 are not being used by the failed rendering component 114, the existing OpenGL resources allocated to the failed rendering component 114 may be released to a new rendering component 124, which may then begin using the OpenGL resources.

After constructing the new rendering component 124, references (e.g., memory pointers) to the failed rendering component 114 utilized by components of the browser engine 108 and the new thread 128 may be replaced with references to the new rendering component 124. In one example, the references may be replaced or updated using notification callbacks. For example, a notification callback may be used to replace a reference to the failed rendering component 114 in a memory location that points to the failed rendering component 114 with a reference that points to the new rendering component 124. The notification callback may originate from the rendering recovery component 120.

Also, in performing a callback, thread synchronization primitives held by the failed rendering component 114 may be released to avoid the occurrence of deadlocks within the browser engine 108. In one example, references to primitives held by the failed rendering component 114 may be collected into a thread-local list, which may be provided to a lock acquire function that utilizes the thread-local list in granting locks (e.g., similar to thread-local storage for variables in C++). In another example, a function configured to open locks acquired by the failed rendering component 114 may be used where the function provides an interface for crash recovery for each class of rendering components 114. In yet another example, an owner thread identifier may be stored within each primitive, and in the event of a failure, primitives held by the failed rendering component may be iterated through to identify thread owners and notify the thread owners that the thread identifier associated with the failed rendering component 114 is no longer valid. Unlocking of locks acquired by the failed rendering component 114 may be performed after any pointers and/or references to internal objects of the failed rendering component 114 have been cleared, so that other objects do not continue using the pointers and/or references when the locks are released.

Having obtained or constructed a new thread 128 and, in some cases, a new rendering component 124 and updated references to point to the new rendering component 124, rendering of electronic content may be resumed. In one example, resuming rendering of electronic content may entail performing the next rendering task in rendering electronic content using the new thread 128 at point that was a previous failure point identified using an execution stack. In a similar example, a new thread 128 may be tasked to take a next message from a work queue and start with the remaining work (leaving the failed work or rendering undone). As an illustration, resuming rendering of an electronic page due to a program exception resulting in a failed graphics rendering engine being replaced with a new graphics rendering engine may entail abandoning drawing of a screen frame associated with a failed thread 112 in the electronic page and retrying drawing of a next screen frame in the electronic page using the new graphics rendering engine.

In another example, a failed rendering task may be retried (e.g., re-executed) using the new thread 128. For example, a stack pointer for an execution stack may be rolled back to point to a sub-program that failed to return control when finished executing, thereby retrying (re-executing) the failed rendering task using the new thread 128.

A recovery flag, in some examples, may be set to indicate that recovery from a program exception may be in progress. The recovery flag may be used to avoid a crash recovery loop, where a recovery from a first program exception may be in progress when a second program exception occurs, causing the recovery process to be started again, potentially creating an infinite loop. The rendering recovery component 120 may be configured to check the status of the recovery flag before attempting a program exception recovery. For example, if the recovery flag is set, then recovery from a program exception may not be attempted and rendering of electronic content may be terminated, thereby avoiding a crash recovery loop. If the recovery flag is not set, then recovery from the program exception may be attempted according to the recovery criteria described above. In some examples, a recovery flag may be used for each component in a browser engine 108 that can fail and recover in isolation from others (e.g., a scripting engine for Javascript or a rendering engine for displaying content).

Figure 2:
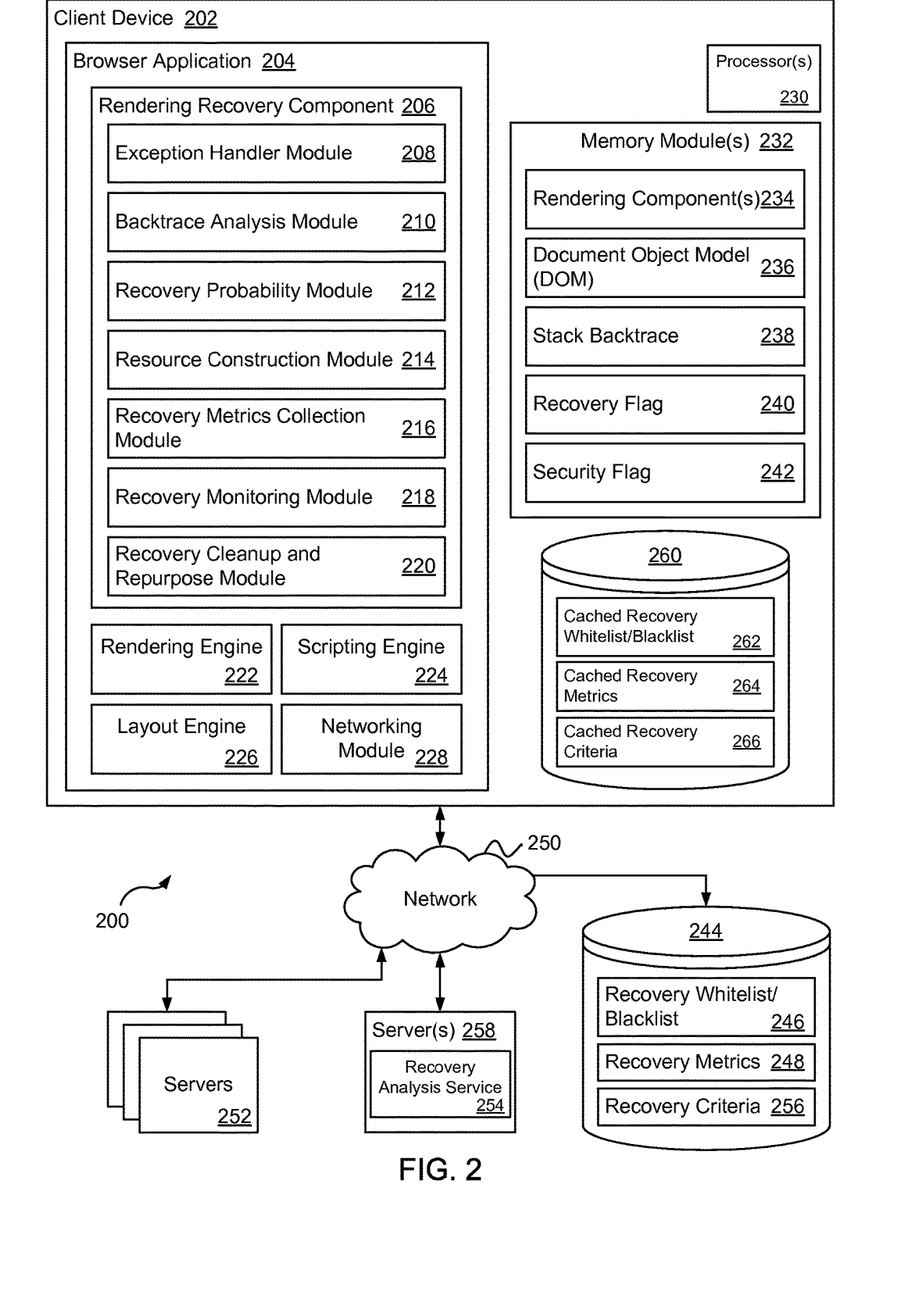
FIG. 2 is a block diagram that illustrates various example components included in a system for recovering from a program exception.

FIG. 2 illustrates components of an example system 200 on which the present technology may be executed. The system 200 may include a client device 202 that executes a browser application 204 used to render and display electronic content, such as electronic pages, documents, video, and video gaming. The client device 202 may be in communication with a plurality of servers 252 that provide electronic content over a network 250. The browser application 204 executed on the client device 202 may contain a rendering engine 222, a layout engine 226, a scripting engine 224, a networking module 228, and a rendering recovery component 206 having a number of modules used in executing a recovery from a program exception. The modules within the rendering recovery component 206 may include an exception handler module 208, a backtrace analysis module 210, a recovery probability module 212, a resource construction module 214, a recovery metric collection module 216, a recovery monitoring module 218 and a recovery cleanup and repurpose module 220.

The exception handler module 208 may be configured to handle a program exception that occurs during rendering of electronic content by the browser application 204. In one example, a sub-program or subroutine may call the exception handler module 208 in the event of a program exception (e.g., an anomalous or error condition that changes the flow of program execution, such as a memory access violation). In another example, the exception handler module 208 may be configured to monitor operations associated with rendering electronic content using the browser application 204 and detect the occurrence of a program exception.

In one example, having detected a program exception, the exception handler module 208 may be configured to determine a status of a recovery flag 240 and/or a security flag 242. The recovery flag 240 may be used to indicate that a recovery attempt may be in progress as described earlier. Thus, if the recovery flag 240 is set, the exception handler module 208 may be configured to terminate rendering of electronic content to avoid a repeating crash recovery loop. The security flag 242 may be set as a result of a method call or executable object that caused a program exception handling a security function (e.g., Hypertext Transfer Protocol by Transport Layer Security (HTTPS)) associated with transferring data between a server 252 and the client device 202. In the case that the security flag 242 is set, recovery from the program exception may not be attempted to avoid exposing encrypted information.

The exception handler module 208 may be configured to call the backtrace analysis module 210 when a program exception occurs. The backtrace analysis module 210 may be configured to analyze a stack backtrace 238 containing a record of active stack frames at a time point during the rendering of electronic content when a program exception occurred to identify a failed executable entity (e.g., a thread, process, method call, function call, or executable object that caused the program exception. In analyzing the stack backtrace 238, a failed executable entity that caused the program exception may be identified, and any rendering components 234 that may have been managed or modified by the failed entity may be identified.

Having identified a failed executable entity and any failed rendering components 234, the recovery probability module 212 may be called. The recovery probability module 212 may be configured to analyze features associated with a failed executable entity and failed rendering components 234 and determine whether the features satisfy recovery criteria 256, such as a failed executable entity performing read-only operations, a failed executable entity not interacting with a large number of rendering components, or a rendering component not being managed by more than one parallel or concurrent process or executable object.

Also, a recovery whitelist and/or recovery blacklist 246 may be referenced to determine whether a failed executable entity and/or failed rendering component 234 may be listed in the recovery whitelist or the recovery blacklist 246. In one example, the inclusion of a failed executable entity and/or a failed rendering component in a recovery whitelist 246 may result in attempting a recovery from a program exception. In another example, whether a failed executable entity and/or a failed rendering component are included on a recovery whitelist 246 may be one factor in determining whether an attempted recovery from a program exception may be attempted. In the case that a recovery blacklist 246 includes a failed executable entity (e.g., a function signature from the call stack) and/or a failed rendering component, then recovery from a program exception may not be attempted. The whitelist and blacklist 246 may be created by collecting data at a central location or central data store regarding the exceptions or errors of multiple browser applications or rendering applications. Statistical analysis may be used to determine whether recovery attempts are successful or not. Then the failed executable entities that are identified statistically as being recoverable may be added to the whitelist and failed executable entities that are identified as being unrecoverable in the aggregate may be added to the blacklist.

In one example, computing environment information associated with executing a browser application 204 on the client device 202 may be used as a factor in determining whether to attempt a recovery from a program exception. The computing environment information may include a current processing load on computing resources (e.g., processors 230 and memory modules 232) that may be used in attempting the recovery. As an illustration, an amount of memory available to construct a new rendering component may be a factor in determining whether to attempt a recovery due to, for example, an amount of memory that may have been leaked as a result of a program exception. In the case that sufficient memory may not be available to construct a new rendering component 234, recovery from the program exception may not be attempted.

In another example, the recovery probability module 212 may be configured to calculate a probability of success in attempting a recovery and proceed with a recovery based on the probability. For example, recovery metrics 248 associated with recovery attempts performed as a result of a particular program exception may be collected and stored (e.g., both locally and remotely) using the recovery metrics collection module 216, and a recovery probability may be calculated for resuming rendering of electronic content using the recovery metrics 248 associated with the particular program exception. If the recovery probability is high enough or meets a predetermined recovery threshold, a recovery may be attempted. As an illustration, recovery metrics 248 for attempted recoveries from a program exception related to the failure of a thread may be collected over a period of time and the recovery metrics 248 may be used to calculate a probability of success in attempting a recovery from the program exception when the particular program exception occurs again.

Recovery metrics 248 may be collected from the client device 202, as well as from a plurality of client devices having the browser application 204 and the rendering recovery component 206 installed on the client devices. In one example, recovery metrics 248 may be provided to a recovery analysis service 254 configured to analyze recovery metrics 248 that may be collected from multiple client devices having the browser application 204 and the rendering recovery component 206 installed. In one example, the recovery analysis service 254 may be hosted on a server 258 within a computing service environment. Recovery probabilities may then be calculated for program exceptions based on the aggregated recovery metrics 248. As such, the recovery metrics 248 may be used to identify recoverable program exceptions and non-recoverable program exceptions, and the recovery analysis service 254 may be configured to provide the client device 202 with information for the recoverable and non-recoverable program exceptions. In addition to sending recovery metrics to the recovery analysis service 254, the client device 202 may report back to the recovery analysis service 254 when an attempt to restart rendering of electronic content is unsuccessful. The recovery analysis service 254 may be configured to analyze information for failed attempts to restart and blacklist threads, method calls, executable objects, and rendering components associated with the failed attempts.

The resource construction module 214 may be configured to construct a new rendering component as a result of a determination that a recovery from a program exception may be attempted. A new thread may reference rendering components utilized by a failed thread and new rendering components constructed using data obtained from data sources that were utilized by failed rendering components (e.g., an existing DOM 236, other rendering components 234, or from servers 252 having the data). In some examples, the resource construction module 214 may be configured to request memory resources from the recovery cleanup and repurpose module 220 and use the memory resources to construct a new rendering component.

The recovery monitoring module 218 may be configured to monitor various aspects of a recovery attempt and allocate computing resources where possible, or terminate the recovery attempt if a determination is made that the recovery is not going to be successful. In one example, a recovery attempt may be monitored using information such as, metrics, measures and/or evidence related to a recovery attempt and various actions may be performed according to the information. As a specific example, computer memory may be monitored during a recovery attempt and in the case that computer memory may become limited (e.g., as a result of an amount of memory leaked), an assumption may be made that some allocations of computer memory are not being actively used and may be reallocated for use in the recovery attempt. As another specific example, a recovery attempt may be terminated as a result of monitoring computer memory in association with a recovery attempt and determining that an amount of computer memory needed to successfully complete the recovery attempt is not available.

The recovery monitoring module 218 may also be configured to monitor a number of recovery attempts to restart rendering of electronic content and terminate an additional attempt to restart the rendering of the electronic content when a predetermined number of recovery attempts have been tried. As an illustration, a predetermined number of recovery attempts may be set (e.g., 2, 3, 5 attempts) and a recovery attempt counter may be used to track a number of recovery attempts that may be performed in association with a reoccurring program exception. For example, a first recovery attempt may fail, whereupon a second recovery attempt may be launched and the recovery attempt counter may be incremented to two. In the event that the value of the recovery attempt counter is equal to the predetermined number of recovery attempts, an additional recovery attempt may be terminated, thereby allowing an associated rendering process to fail.

The recovery cleanup and repurpose module 220 may be configured to reclaim and/or repurpose computer memory (e.g., computer memory blocks) allocated to a failed rendering component. In one example, the recovery cleanup and repurpose module 220 may be configured to identify computer memory (e.g., computer memory blocks) allocated to a failed rendering component and release the computer memory back to a memory heap. The recovery cleanup and repurpose module 220 may be configured to release the computer memory back to a memory heap (e.g., a globally managed memory heap or application managed memory heap) after attempting a recovery from a program exception using a new rendering component. Thereafter, the computer memory may be reclaimed once a recovery attempt has either succeeded or failed. Further, shared computer memory (e.g., semaphores shared by multiple threads, buffers allocated to a graphics driver, etc.) allocated to a failed rendering component may not be able to be released back to a memory heap, but may instead be repurposed by assigning the shared memory to a new rendering component. For example, because after abandoning and suspending a failed rendering component, the failed rendering component is no longer utilizing the shared computer memory, the computer memory can be reclaimed from the failed rendering component and reassigned to a new rendering component. In one example, allocated memory blocks may be tagged with an owner ID (e.g., a failed rendering component ID) and the owner ID may be used to identify computer memory blocks owned by the failed rendering component ID by traversing a memory manager's list of computer memory blocks and reclaiming the computer memory blocks.

The recovery cleanup and repurpose module 220 may also delay cleanup of a terminated thread and failed rendering components for a time period until recovery has been determined to be successful. This success may be defined by restarting rendering of electronic content and the transfer of the rendering components 234 to a new thread. Then the terminated thread and rendering thread may have their resources 234 released for use by the application or the operating system. In some cases, terminated thread and failed rendering components may be abandoned, thereby leaking computer memory that was not reclaimed until an associated browser engine is terminated.

In one example configuration, the state of a thread and the rendering components 234 at the time of a program exception may be stored to a centralized server or a virtualized storage location that is separate from the local memory being used. Then recovery of the thread and the rendering components may be undertaken. If the recovery of the thread is successful, then this state and the stored rendering components may be re-loaded by the new thread that was created.

In another scenario, the rendering may be performed in double buffered fashion. For example, two temporal rendering states (a current visible frame and a next future frame being constructed) may exist. If the next frame fails, the existing frame buffer bitmap may remain visible, and the next frame may be either retried or skipped, depending on how much time may be available before the frame's deadline to become visible. The new rendering engine instance may then attempt to retry the same frame that failed, or start working on the next frame when the time comes.

Performance of the overall application may be used as a metric for determining whether recovery of rendering electronic content may be undertaken. For example, if a browser or application has previously been able to render graphics at 60 frames per second but due to previous failures, recovery attempts, and memory losses is currently able to render 15 frames per second, then recovery may not be attempted. Similarly, if a browser or application is using an unexpectedly large amount of memory, then recovery may not be undertaken.

The client device 202 may include any device capable of sending and receiving data over a network 250. A client device 202 may comprise, for example a processor-based system such as a computing device. A client device 202 may be a device such as, but not limited to, a desktop computer, laptop or notebook computer, tablet computer, mainframe computer system, handheld computer, workstation, network computer, or other devices with like capability. A client device display may comprise, for example, one or more devices such as cathode ray tubes (CRTs), liquid crystal display (LCD) screens, gas plasma-based flat panel displays, LCD projectors, or other types of display devices, etc.

The various processes and/or other functionality may be executed on one or more processors 230 that are in communication with one or more memory modules 232. The client device 202 may be in communication via the network 250 with a number of computing devices (e.g., servers 258) that are arranged, for example, in one or more server banks or computer banks or other arrangements hosting the recovery analysis service 254. The computing devices may support a computing environment using hypervisors, virtual machine monitors (VMMs) and other virtualization software.

A data store 244 accessible to the client device 202 via the network 250 may be used to store recovery whitelists and recovery blacklists 246, recovery metrics 248, and recovery criteria 256, and a data store 260 located on the client device 202 may store cached versions of data stored on the data store 244 (e.g., cached recovery whitelists and recovery blacklists 262, cached recovery metrics 264, and cached recovery criteria 266). The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 244 may include storage systems such as a SAN (Storage Area Network), cloud storage network, volatile or non-volatile RAM, optical media, or hard-drive type media. The data store 244 may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network 250 may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
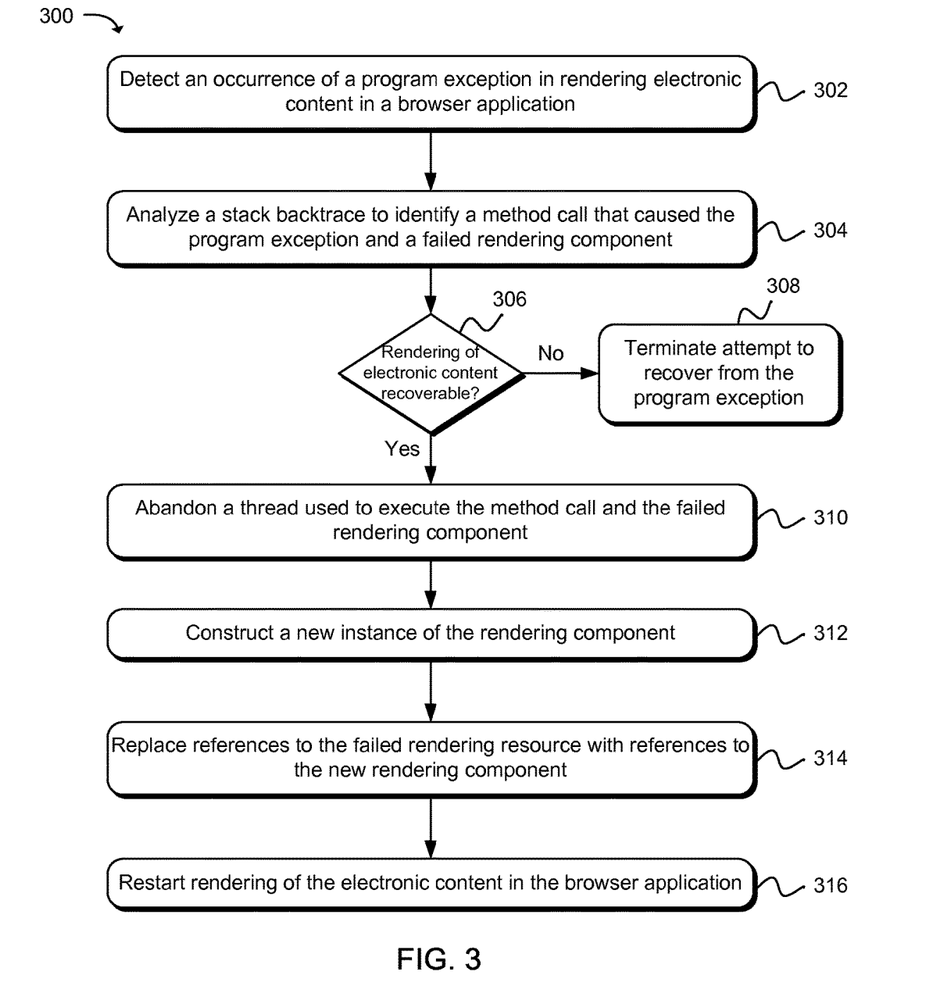
FIG. 3 is a flow diagram that illustrates an example method for attempting a recovery from a program exception occurring as part of rendering electronic content using a browser application.

Moving now to FIG. 3, a flow diagram illustrates an example method 300 for attempting a recovery from a program exception occurring as part of rendering electronic content using a browser application. Starting in block 302, an occurrence of a program exception in rendering content in a browser application may be detected. The program exception may be associated with an error that may be encountered during execution of the browser application. The error may be the result of a thread executing a rendering task incorrectly. After detecting the program exception, as in block 304, a stack backtrace may be analyzed to identify a method call or executable object that caused the program exception and a failed rendering component that may have failed due to the program exception.

As in block 306, a determination may then be made whether rendering of the electronic content may be recoverable. For example, a determination may be made whether a recovery from the program exception is possible using recovery criteria, where features of the failed method call or executable object and, in the case of a failed rendering component, features of the failed rendering component may be analyzed to determine whether the features satisfy certain recovery criteria as described in relation to FIG. 1. In the case that a determination is made that the recovery criteria is not satisfied, then as in block 308, the attempted recovery from the program exception may be terminated.

In the case that the recovery criteria is satisfied, then as in block 310, the failed thread that caused the program exception may be abandoned along with any failed rendering components. In some examples, in abandoning the failed thread, recovery of computer memory allocated for use by the failed thread and any failed rendering components may be postponed until after the attempted recovery either succeeds or fails, thereby allowing for computing resources (e.g., processing) to be used in the attempted recovery from the program exception.

As in block 312, a failed rendering component may be constructed using data obtained from data sources having data referenced by the failed thread. For example, the data may be obtained from a respective DOM, other rendering components, or from external servers that originally provided the data. After constructing the new rendering component, as in block 314, references (e.g., registers storing memory addresses) to the failed rendering component may be replaced with references to the new rendering components. In one example, notification callbacks may be used to replace references to the failed rendering component used by a browser engine and other browser application components with references to the new rendering component.

As in block 316, rendering of the electronic content may be restarted using a new thread that references the new rendering component. In one example, restarting the rendering of electronic content may be performed by executing the new thread starting at the failure point identified in an execution stack. As a result, in some examples, an electronic page may not be fully rendered (e.g., a screen frame may be missing), but may otherwise be fully functional. In another example, an attempt to re-execute a failed rendering task may be performed, and if successful, a resulting electronic page may be fully rendered.

In an alternative example, the present technology may be used to recover from a program exception that occurs during the execution of an application (e.g., system process, utility software, data store management software, etc.) that does not perform rendering of electronic content but may perform other types of data processing, business functions, etc. For example, upon detecting a program exception, a failed executable entity (e.g., method call or object) that caused the program exception may be identified and any resources (objects, variables, data structures, etc.) utilized by the failed executable entity may be identified. A determination my then be made whether recovery from the program exception may be possible using recovery criteria as described earlier, and a thread used to execute the failed executable entity and any failed resources may be abandoned. Failed resources may be reconstructed as needed and a new thread that references the resources used by the failed executable entity and/or reconstructed resources may be used to recover execution of the application.

Figure 4:
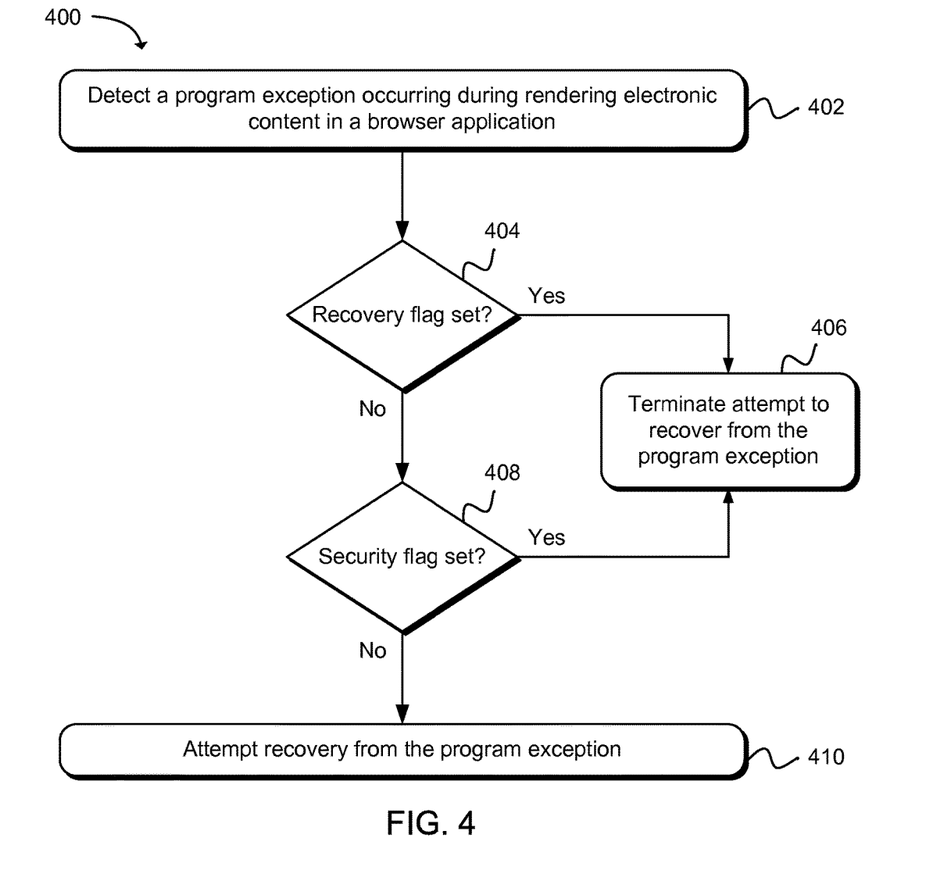
FIG. 4 is a flow diagram illustrating an example method for determining whether to attempt a recovery from a program exception according to the state of flag variables representing an internal state of a browser application.

FIG. 4 is a flow diagram illustrating an example method 400 for determining whether to attempt a recovery from a program exception according to the state of flag variables representing an internal state of a browser application. Beginning in block 402, a program exception that occurs during rendering of electronic content in a browser application may be detected as described earlier. After detecting the program exception, as in block 404, the state of a recovery flag (e.g., a Boolean variable) may be determined. The state of the recovery flag may be used to indicate whether recovery from the program exception may have already been attempted. As such, the recovery flag may be used in avoiding a crash recovery loop that could result in an infinite loop.

The status of the recovery flag may be determined prior to attempting a program exception recovery. If the recovery flag is set, then as in block 406, recovery from the program exception may not be attempted and rendering of electronic content may be terminated, whereupon the recovery flag may be unset to indicate that a recovery attempt is not in progress. If the recovery flag is not set, then recovery from the program exception may be attempted according to the recovery criteria described above and the recovery flag may be set to indicate that a recovery attempt is in progress.

As in block 408, a state of a security flag may be determined. The state of the security flag may be used to indicate that a process associated with a browser security function (e.g., an HTTPS function) may have been executing at the time that the program exception occurred. For example, when a process associated with a security function is entered, the security flag may be set, and when the process is exited, the security flag may be unset. In some examples, when a program exception occurs during the performance of a security function, a recovery from the program exception may not be attempted, regardless of whether the security function caused the program exception or a thread as described earlier caused the program exception. Accordingly, when attempting a recovery from a program exception, the security flag may be referenced to determine whether the attempted recovery may be performed.

In the case that the recovery flag and the security flag are not set, then as in block 410, an attempted recovery from the program exception may be performed as described in relation to FIGS. 1-3. As will be appreciated, the order in which the states of the recovery flag and the security flag are determined may be rearranged relative to the order shown in FIG. 4. Further, the states of the recovery flag and the security flag may be determined in parallel or by using partial parallelization.

Figure 5:
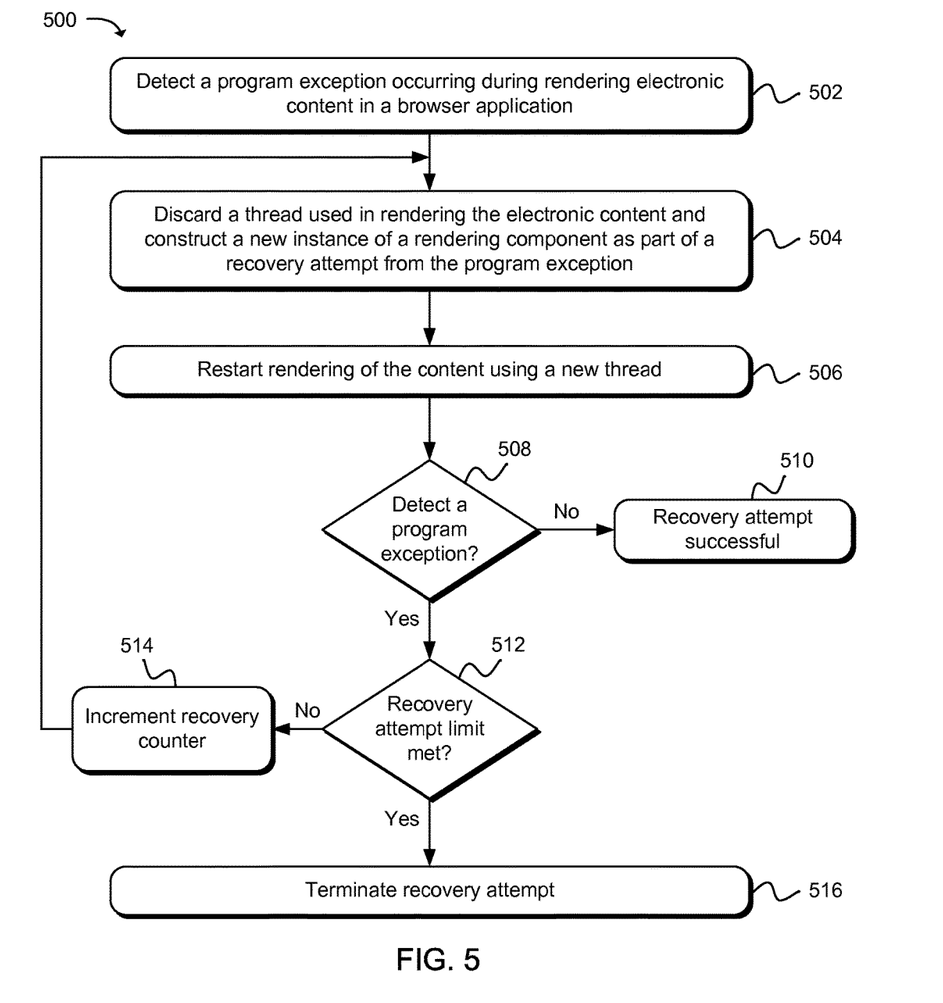
FIG. 5 is a flow diagram that illustrates an example method for recovering from a program exception based on a number of recovery attempts that have been performed.

FIG. 5 is a flow diagram that illustrates an example method 500 for attempting a recovery from a program exception according to an attempted recovery limit. Beginning in block 502, a program exception occurring during rendering of electronic content in a browser application may be detected, and in the event that a determination may be made that a recovery attempt may be performed, as in block 504, a thread used in rendering the electronic content may be discarded and a new instance of a rendering component may be constructed as part of the attempt to recover from the program exception.

As in block 506, rendering of electronic content may then be resumed using a new thread and the new rendering component. A recovery counter that may be used to track a number of times that a recovery attempt has been performed in response to a certain program exception may be initialized. For instance, the recovery counter may be set to an initialized value (e.g., 1) in response to a first recovery attempt, and in the event that the first recovery attempt fails and a subsequent recovery attempt is performed, the recovery counter may be incremented (e.g., incremented by 1) to represent the subsequent recovery attempt. A recovery attempt limit that defines a maximum number of recovery attempts that may be performed before terminating additional recovery attempts may be defined, and the value of the recovery counter may be compared to the recovery attempt limit to determine whether a maximum number of recovery attempts have been performed.

In restarting rendering of the electronic content using the new instance of the rendering component, as in block 508, if another program exception is not detected (e.g., not detected during a predetermined amount of time, such as 10, 15, or 30 seconds), then as in block 510, the rendering attempt may be considered successful. Whereas in the case that another program exception is detected, then as in block 512, a determination may be made whether the recovery attempt limit has been met. In the case that the recovery attempt limit has not been met, as in block 514, the recovery counter may be incremented and a new recovery attempt may be performed (e.g., a failed rendering component may be abandoned and a new rendering component may be constructed). In the case that the recovery attempt limit is met, then as in block 516, the recovery attempt may be terminated and further attempts to restart rendering of the electronic content may be abandoned. As a result, a browser application (or a browser tab) may be allowed to fail and a user may then have to restart the browser application or reload the electronic content within a browser window.

In some examples, a recovery counter used to track a number of recovery attempts that have been performed may be decremented after a predetermined amount of time. As an illustration, a recovery attempt limit may be set to allow three recovery attempts. In the case that two recovery attempts are performed and a predetermined amount of time (e.g., 5, 12, 18 hours) passes without a third recovery attempt being performed, the recovery counter may be decremented to an initialized value, thereby allowing additional recovery attempts to be performed up to the recovery attempt limit.

Figure 6:
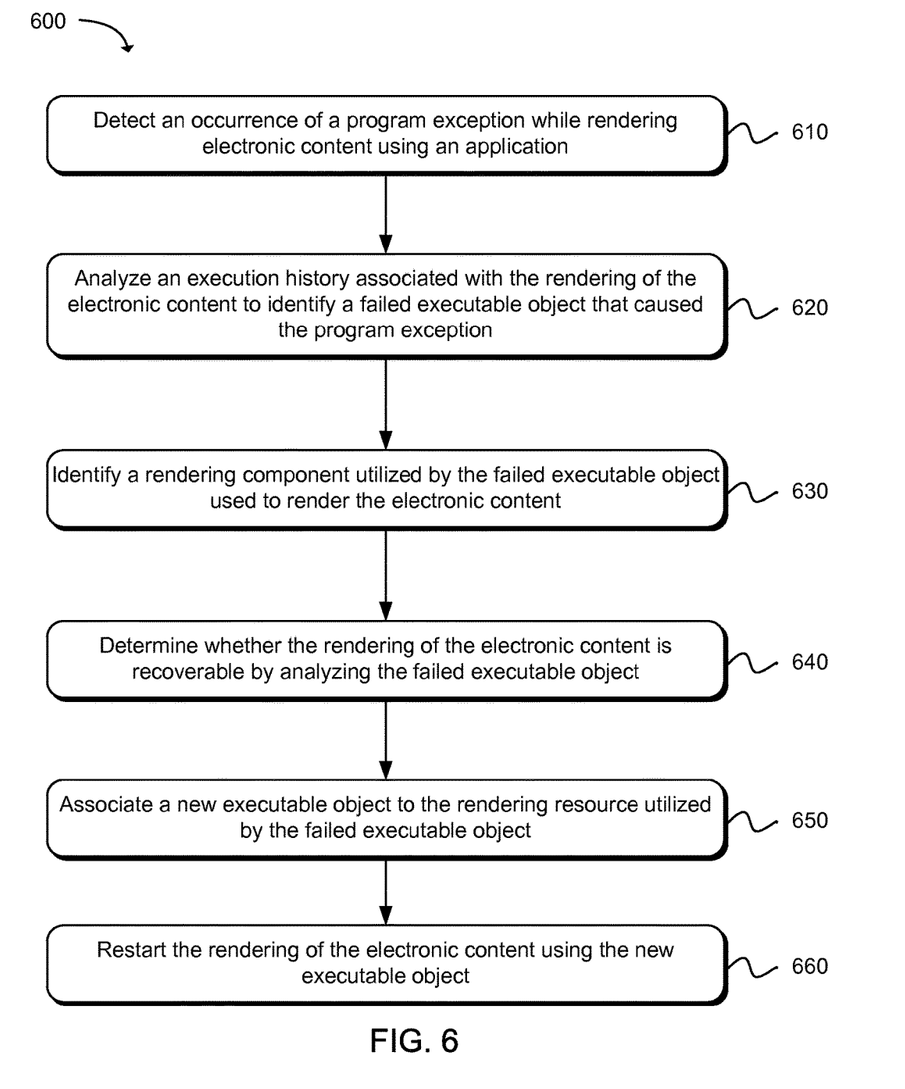
FIG. 6 is a flow diagram illustrating an example method for performing a recovery from a program exception that occurs while rendering electronic content using an application.

FIG. 6 is a flow diagram illustrating an example method 600 for attempting a recovery from a program exception that occurs while rendering content using an application. An application may be software used to render electronic content shown in an application screen or window. Illustratively, an application may be a media player, video game, image viewer, browser, mobile application installed on a mobile device, as well as other types of applications.

Starting in block 610, an occurrence of a program exception may be detected while rendering electronic content using an application. As a result of the program exception, the application may stop rendering the electronic content. For example, during rendering of an electronic page, an image, a video, a video game, etc., a program exception may occur and rendering of the electronic content may stop.

As in block 620, an execution history associated with the rendering of the electronic content may be analyzed to identify a failed executable object that caused the program exception resulting in stopping the rendering of the electronic content. For example, a stack backtrace associated with the application that contains a record of active stack frames at a time point during the rendering of the electronic content when the program exception occurred may be analyzed to identify the failed executable object that caused the program exception. In one example, an executable object may be a particular instance of a class where the executable object can be a combination of variables, methods, functions, and data structures.

As in block 630, a rendering component used to render the electronic content and utilized by the failed executable object that caused the program exception may be identified and, as in block 640, a determination may be made whether the rendering of the electronic content may be recoverable by analyzing the failed executable object. For example, features of the failed executable object may be compared to recovery criteria to determine whether the features satisfy the recovery criteria as explained earlier. As in block 650, a new executable object may be associated with the rendering component utilized by the failed executable object. Then, as in block 660, rendering of the electronic content may be restarted using the new executable object.

Figure 7:
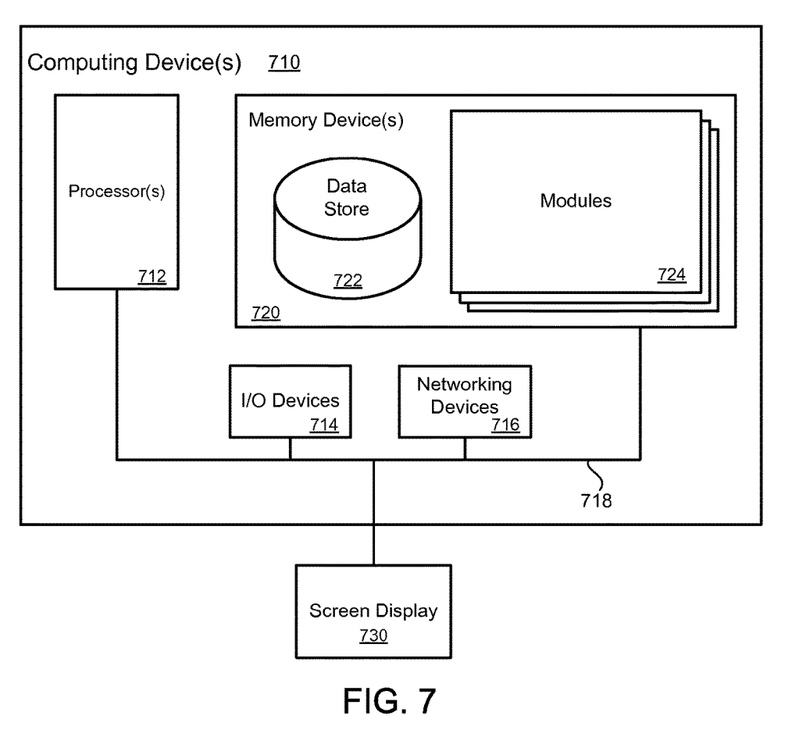
FIG. 7 is block diagram illustrating an example of a computing device that may be used to execute a method for recovering from a program exception that occurs during rendering electronic content using an application.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. For example, the memory device 720 may contain an exception handler module, a backtrace analysis module, a recovery probability module, a resource construction module, a recovery metric collection module, a recovery monitoring module, and a recovery cleanup module. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen 730 that is available to display output from the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium including instructions embodied thereon for a browser application, the instructions when executed by a processor:
    detect an occurrence of a program exception while rendering an electronic page using the browser application, the program exception causing the rendering of the electronic page to stop;
    analyze a stack backtrace associated with the rendering of the electronic page to identify a failed method call that caused the program exception, wherein the failed method call was executed with the browser application as part of rendering the electronic page;
    identify a failed rendering component referenced by the failed method call, wherein the failed rendering component includes data used by the browser application to render the electronic page displayed within the browser application;
    determine whether the failed method and the failed rendering component are recoverable using recovery criteria, wherein features of the failed method and the failed rendering component are analyzed to determine whether the features satisfy the recovery criteria;
    discard a thread used to execute the method call and the failed rendering component as a result of a determination that the rendering of the electronic page is recoverable;
    construct a new rendering component that is an instance of the failed rendering component, wherein the new rendering component is constructed by obtaining the data for the new rendering component from data sources that provided the data for the failed rendering component;
    replace references to the failed rendering component with references to the new rendering component in the browser application using notification callbacks; and
    resume the rendering of the electronic page using a new thread and the new rendering component.

2. A non-transitory machine readable storage medium as in claim 1, wherein the instructions that when executed by the processor further set a recovery flag as a result of the determination that recovery from the program exception is possible, wherein the recovery flag indicates that recovery from the program exception is in progress.

3. A non-transitory machine readable storage medium as in claim 1, wherein the instructions that when executed by the processor further terminate rendering of the electronic page as a result of an additional occurrence of the program exception while rendering the electronic page when a recovery flag is set, thereby avoiding a crash recovery loop.

4. A computer implemented method, comprising:
    detecting an occurrence of a program exception while rendering electronic content using an application;
    analyzing an execution history associated with the rendering of the electronic content to identify a failed rendering component referenced by an executable object of the application associated with the program exception, wherein the failed rendering component includes data used by the application to render the electronic content;
    determining that the rendering of the electronic content is recoverable by replacing the failed rendering component that includes the data used by the application to render the electronic content;
    constructing a new rendering component that is an instance of the failed rendering component, wherein the new rendering component is constructed by obtaining the data for the new rendering component from data sources that provided the data for the failed rendering component;
    replacing references to the failed rendering component with references to the new rendering component; and
    restarting the rendering of the electronic content by the application using the new rendering component.

5. A method as in claim 4, wherein analyzing the execution history associated with the rendering of the electronic content further comprises, analyzing a stack backtrace to identify the executable object associated with the program exception, wherein the stack backtrace contains a record of active stack frames at a time point during the rendering of the electronic content when the program exception occurred.

6. A method as in claim 4, wherein analyzing the execution history associated with the rendering of the electronic content further comprises, analyzing an identifier stack that is maintained by a browser application to identify the executable object associated with the program exception, wherein the identifier stack contains an executable object identifier at a time point during the rendering of the electronic content when the program exception occurred.

7. A method as in claim 4, further comprising identifying a failed executable object associated with the program exception via an identifier associated with the executable object.

8. A method as in claim 4, further comprising:
    abandoning a failed executable object and the failed rendering component as a result of the determination that the failed executable object and the failed rendering component are replaceable; and clearing references to internal objects included in the failed executable object, thereby indicating an internal error state.

9. A method as in claim 4, wherein the references to the failed rendering component are replaced using notification callbacks utilized by a browser engine as part of rendering the electronic content.

10. A method as in claim 4, wherein a rendering component includes at least one of: a StyleSheet object, Document Object Model (DOM) object, texture object, data object, file, record, or data array.

11. A method as in claim 4, further comprising determining that the failed rendering component is replaceable as a result of the failed rendering component not being managed by more than one parallel or concurrent executable object.

12. A method as in claim 4, further comprising collecting recovery metrics for recovery of electronic content rendering after the occurrence of the program exception while rendering the electronic content, wherein the recovery metrics are used to identify recoverable program exceptions and non-recoverable program exceptions.

13. A method as in claim 12, further comprising calculating a recovery probability for restarting rendering of the electronic content using the recovery metrics associated with the program exception.

14. A method as in claim 12, further comprising creating a recoverable rendering component list and a non-recoverable rendering component list using the recovery metrics, wherein the recoverable rendering component list and the non-recoverable rendering component list are used in determining whether the rendering of the electronic content is recoverable by replacing the failed rendering component with the new rendering component.

15. A method as in claim 4, further comprising determining a status of a security flag that is set as a result of a process that handles a security function associated with transferring data between the application and a server, wherein recovery of rendering of the electronic content is not attempted when the security flag is set.

16. A method as in claim 4, further comprising:
identifying application components that are unaffected by the program exception having resources that are used by an executable object, wherein the application components are tracked using identifiers that identify the application components; and
instructing the executable object to obtain the resources from the application components which are unaffected.

17. A method as in claim 4, further comprising:
identifying computer memory used by a failed rendering component; and
releasing the computer memory back to a heap after attempting the rendering of the electronic content using the new rendering component.

18. A system comprising:
a processor;
a memory device including instructions that, when executed by the processor, cause the system to:
detect an occurrence of a program exception while rendering electronic content using a browser application, wherein the program exception is related to a failed rendering component that includes data used by the browser application to render the electronic content;
analyze a stack backtrace associated with the rendering of the electronic content to identify the failed rendering component, wherein an executable object of the browser application referenced the failed rendering component to obtain the data used to render the electronic content;
determine whether the rendering of the electronic content is recoverable by analyzing the failed rendering component;
abandon the failed rendering component as a result of a determination that the failed rendering component is replaceable;
construct a new rendering component as a result of the determination that the rendering of the electronic content is recoverable; and
register the new rendering component with the browser application, thereby allowing the rendering of the electronic content to restart.

19. A system as in claim 18, wherein the memory device includes instructions that, when executed by the processor, causes the system to obtain computing environment information associated with executing the browser application on a computing device for use as a factor in determining whether the rendering of the electronic content is recoverable.

20. A system as in claim 18, wherein the memory device includes instructions that, when executed by the processor, causes the system to:
collect recovery metrics from a plurality of computing devices executing the browser application, the recovery metrics being associated with restarting the rendering of the electronic content; and
calculate a recovery probability for restarting the rendering of the electronic content using the recovery metrics.

21. A system as in claim 18, wherein the memory device includes instructions that, when executed by the processor, causes the system to:
monitor a number of recovery attempts to restart the rendering of the electronic content; and
terminate an attempt to restart the rendering of the electronic content as a result of meeting a predetermined number of recovery attempts within a period of time.

22. A system as in claim 21, wherein the memory device includes instructions that, when executed by the processor, causes the system to report to a recovery analysis service that the attempt to restart the rendering of the electronic content was unsuccessful, wherein the recovery analysis service is hosted within a computing service environment.

* * * * *